Jan. 20, 1970   HIDEO MUKAI ET AL   3,490,712
DIFFERENTIAL WINDING UP SYSTEM FOR WINDERS
Filed Aug. 10, 1967

INVENTORS
HIDEO MUKAI
KENZO HASHIMOTO
BY Morgan, Finnegan, Durham & Pine
ATTORNEYS INVENTORS
HIDEO MUKAI
KENZO HASHIMOTO
BY Morgan, Finnegan, Durham & Pine
ATTORNEYS

3,490,712
DIFFERENTIAL WINDING UP SYSTEM FOR WINDERS
Hideo Mukai, 2 Maede-cho, Otowa, Yamashina, Higashiyama-ku, and Kenzo Hashimoto, 23 Ushiwaka-cho, Shichiku, Kita-ku, both of Kyoto, Japan
Continuation-in-part of application Ser. No. 538,648, Mar. 30, 1966. This application Aug. 10, 1967, Ser. No. 659,765
Claims priority, application Japan, Aug. 13, 1966, 41/53,377
Int. Cl. B21c *13/06*
U.S. Cl. 242—75.53                 4 Claims

ABSTRACT OF THE DISCLOSURE

A differential winding up system for winders including differential transmission means imparting differential outputs from a single drive power source to material delivering means and winding roll shaft driving means, in which the differential outputs transmitted to said winding roll shaft driving means are controlled by a roller having a fixed diameter in such a manner that the output torque for driving the winding roll shaft is increased with a predetermined rate according as the winding diameter is increased, whereby an automatic control during the winding operation can be achieved with a substantially constant speed characteristic and any tension characteristic as desired.

BACKGROUND AND OBJECTS OF THE INVENTION

This application is a continuation-in-part of my prior copending application S.N. 538,648, filed Mar. 30, 1966, now abandoned, the subject matter of which is contained in my copending application S.N. 716,118, filed Mar. 26, 1968.

This invention relates to improvements in a differential winding up system for winders especially to improvements in such a differential winding up syste mfor automatically and differentially controlling the material feeding speed and the winding up tension.

A pronounced advantage of this system is that if a fluid transmission (hydraulic transmission and pneumatic drive method) is used, the whole system can be completed with a very simple circuit structure. In a mechanical case, use may be made of a differential gear system, but this is complicated and requires a large space and hardly provides smooth rotation and allows only two outputs to be obtained from a single apparatus, so that in order to obtain a large number of outputs many differential gear systems are required. As contrasted thereto, with fluid, merely by tapping the piping to provide branches, it is possible to obtain the function of differential transmission means from which any desired number of outputs can be obtained at will. In addition there is no irregularity in transmission and thus the rotation is smooth and the torque is divided with correctness in accordance with the capacity ratio of the motor used. Further, if the motor used is of the variable capacity type, the transmission can be optionally controlled to change the torque characteristics. If the prime mover pump used is also of the variable capacity type, the speed of the whole machine can be adjusted over the range from full stop to maximum speed, without causing any variation in torque and tension. Moreover, even at very low speed, positive and stabilized driving is possible, and also during stop the same magnitude of torque as that during running can be maintained. Besides these merits, there are various additional merits such as absorption of shocks, prevention of overload by applying quick brake, and high transmission efficiency.

The primary object of the invention is to provide an improved and useful differential winding up system for winders in which the above mentioned advantages are obtained.

Another object of the invention is to provide an improved and useful differential winding up system for winders of such a type that the winding roll is driven from its central shaft, whereby an automatic control during the winding operation can be achieved with a substantially constant speed characteristic and any tension characteristic as desired at will.

A further object of the invention is to provide an improved and useful differential winding up system for winders of such a type that the winding roll is driven from its central shaft, whereby an automatic control during the winding operation can be achieved with a perfectly constant speed characteristic and any tension characteristic as desired at will.

SUMMARY OF THE INVENTION

The differential winding up system to which the invention is applied includes a supply roll, delivering means for the material to be wound up from the supply roll, a winding roll, winding roll shaft driving means and differential transmission means. The differential transmission means imparts differential outputs from a single drive power source to delivering means and winding roll shaft driving means. The differential transmission means may be either hydraulic or mechanical.

According to the invention, the differential output transmitted to winding roll shaft driving means is controlled in such a manner that the output torque for driving the winding roll shaft is increased with a predetermined rate according to the winding diameter is increased.

In the case of a hydraulic differential transmission, differential transmission means comprises a hydraulic pump and at least two hydraulic motors for driving material delivering means and winding roll shaft, respectively. The two hydraulic motors are connected in parallel with respect to the hydraulic pump. The hydraulic motor for driving the winding roll shaft is controlled in such a manner that the ratio of the number of revolutions of the hydraulic motor to its quantity of flow is automatically reduced with a predetermined rate according to the winding diameter is increased. This control may preferably be carried out by utilizing means for continuously varying the capacity of the hydraulic motor for driving the winding roll shaft.

The output of the hydraulic motor for driving the winding roll shaft may be considerably larger than that of the hydraulic motor for driving material delivering means.

In the above manner, a substantially constant speed characteristic is obtained together with any tension characteristic as desired.

In a modified form of the invention, the material feeding speed is detected at a roller which is included in material delivering means. This roller may be either a feed roller or an intermediate friction roller for transmitting the drive power to the feed roller. The only requirement is that it rotates with a speed proportional to the material feeding speed and has a fixed diameter during the winding operation. The speed change mechanism of the prime mover of the system is automatically controlled so that the detected feeding speed is always maintained at a constant value. In this manner, an automatic control during the winding operation can be achieved with a perfectly constant speed characteristic and any tension characteristics as desired.

The other objects and advantages of the invention will become apparent from the following detailed description in conjunction with the acompanying drawings in which

DESCRIPTION OF THE PREFERRED EMBODIMENTS

Figure 1:
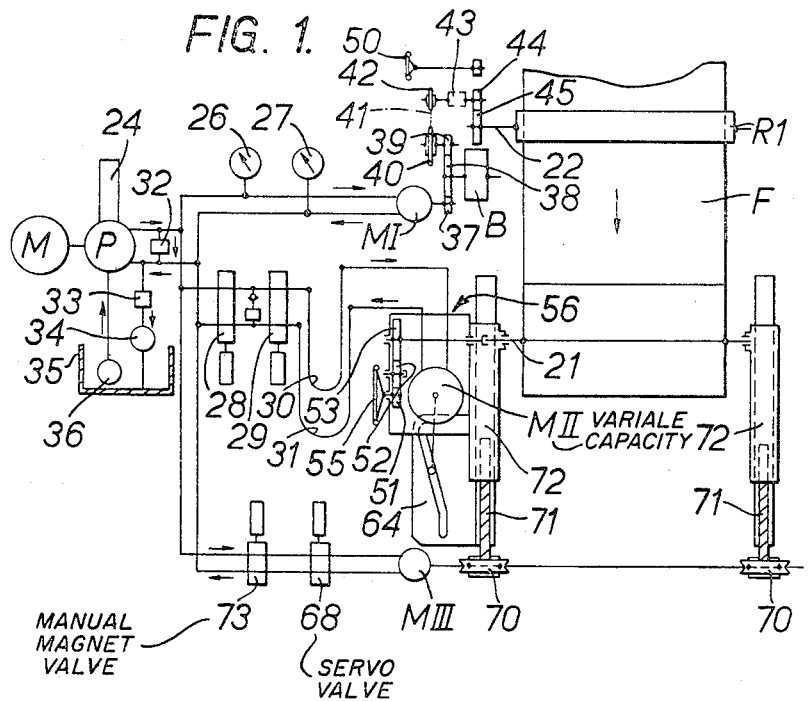
FIGURE 1 is a circuit diagram of a hydraulic system illustrating an apparatus embodying the present invention.
Figure 2:
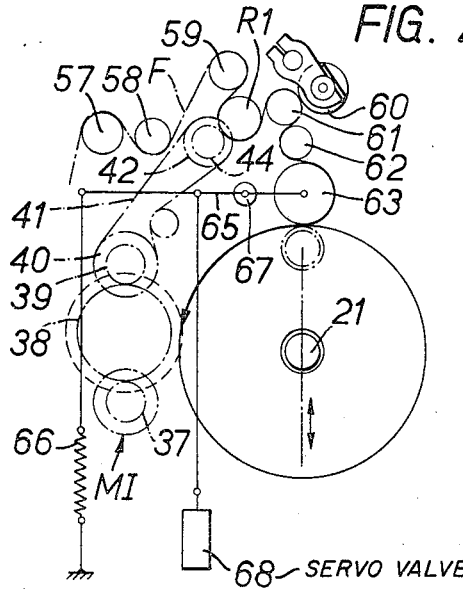
FIGURE 2 is a schematic view showing a winding machine in a winding condition, said winding machine being provided with a hydraulic system illustrated in FIGURE 1.

FIGURES 1 and 2 illustrate an embodiment of the present invention applied to a winding device for a slitter. In FIGURE 1, a hydraulic pump of variable capacity P is driven by an electric motor M and is adapted to have its capacity changeable by means of a capacity change mechanism 24 so as to control the quantity of flow ranging from zero to maximum. The pressure oil delivered from the hydraulic pump P branches out to flow to hydraulic motors MI and MII, and after the oil streams have driven these hydraulic motors they flow together back into the hydraulic pump P. The numerals 26 and 27 designate pressure gauges installed on the high and low pressure sides, respectively, of the entire oil pressure circuit; 28 and 29, magnet valves placed in a circuit to a winding hydraulic motor MII; 30 and 31, parts constituted by rubber hoses in said circuit to the hydraulic motor MII; 32, a safety valve; 33, a relief valve placed in the low pressure side circuit; 34, a filter; 35, an oil bath; and 36, a strainer.

As shown in FIGURES 1 and 2, the rotation of the hydraulic motor MI is transmitted to a rotating shaft 22 for a delivery roller $R_1$ for material paper F to be slitted through gear wheels 37, 38, 39, a chain transmission mechanism 40, 41, 42, a clutch 43, and gear wheels 44, 45. A brake B operating on the shaft of the gear wheel 38 is adapted to control the transmission to the delivery roller $R_1$. Further, this delivery roller $R_1$ can be operated or regulated manually by means of a handle 50, if the clutch 43 is disengaged. The other hydraulic motor MII drives a winding shaft 21 through gear wheels 51, 52 and 53. Though not shown, a winding drum is attached to the winding shaft 21 and adapted to wind slitted paper thereon. Designated at 55 is a handle for manually operating the winding shaft 21. The assembly generally indicated as 56 consisting of the hydraulic motor MII and transmission means 51, 52, 53 is adapted to be movable, as hereinafter described, in accordance with the displacement of the winding shaft 21. It is to this end that the circuit to the hydraulic motor MII has the rubber hose connections 30 and 31 as mentioned above.

The material paper F is delivered by means of feed drive rollers 59, $R_1$ and 61 through guide rolls 57 and 58 and is slitted while it is passing between upper and lower blades 60 and 61, and it is then moved around a guide roll 62 and a pressing roll 63 to be finally wound on the winding drum on the winding shaft 21.

The hydraulic motor MII has incorporated therein a continuously variable capacity change mechanism (therefore the motor MII is a variable capacity type motor), and is thus adapted to have its capacity increased in response to any increase in the winding diameter, thereby to decelerate the motor MII. That is, when the winding diameter is slightly increased, the pressing roll 63 in pressure contact with the winding periphery functions as a sensor to be slightly moved upward, so that a sensing lever 65 supporting at one end said pressing roller 63 is turned counterclockwise around a fulcrum 67 thereby to slightly open a servo-valve 68 connected to the lever 65. A spring 66 provided at the rearmost end of the sensing lever 65 serves to counteract the weight of the large pressing roller 63 to allow the adjustment of pressure to any suitable value. The servo-valve 68 is placed in an oil pressure circuit to a further hydraulic motor MIII connected in parallel with the aforementioned hydraulic motors MI and MII (FIGURE 1). The opening of the servo-valve 68 causes the hydraulic motor MIII to be slightly driven, the output of the motor MIII being transmitted to two worm gears 70, so that winding shaft supporting members 72 screwed on the rotating shaft 71 of the worm gears 70 are lowered in response to the rotation of the rotating shafts 71. When the winding shaft 21 is lowered until the pressing roller 63 assumes its initial position, the servo-valve 68 is closed, whereby the lowering of the winding shaft 21 is stopped. In practice, this functions continuously and the winding shaft 21 is automatically and smoothly lowered at slow speed in accordance with the increase in winding diameter. The numeral 73 designates a manually operable magnet valve for positively raising and lowering the winding shaft 21.

Attending the lowering of the winding shaft 21, the assembly 56 consisting of the hydraulic motor MII, transmission means 51, 52, 53 and winding shaft 21 is lowered, the displacement of the lowering of the hydraulic motor MII causing the capacity of the hydraulic motor MII to be automatically increased by means of a cam plate 64, so that the output torque of the hydraulic motor MII is increased and the number of revolution thereof is decreased. The hydraulic motors MI, MII and hydraulic pump P will suitably be of the axial plunger type. It is advantageous that the output of the hydraulic motor MII is considerably high as compared with that of the hydraulic motor MI. Also, the hydraulic motor MIII for lowering the winding shaft 21 may be of similar arrangement, or, alternatively, a hydraulic motor of the water wheel type would well serve the purpose.

However, the degree of changes in those values is determined by the ratio of the quantities of flow (the capacities and the reduction ratio of the hydraulic motors) into the hydraulic motors. That is, in case that the quantity of flow through the flow path to the feed roller $R_1$ is very small while the quantity of flow through the flow path to the winding shaft 21 is very large, the resulting characteristic is approximately such that the number of revolutions of the winding shaft 21 is constant, the speed is proportional to the diameter, the tension is constant, and the torque is proportional to the diameter. In case that the ratio of the flow quantities is reversed, the resulting characteristic is approximately such that the number of revolutions for winding is inversely proportional to the winding diameter, the speed is constant, the tension is inversely proportional to the diameter and the torque is constant.

Further, the hydraulic motors MI and MII are constantly under the same hydraulic pressure, so that the ratio of the horsepower produced therein is equal to the ratio of the quantities of flow. For this reason, in case that the quantity of flow to the hydraulic motor MI is large and the other is small, a very high horsepower is consumed by the brake B and a very small amount of force can only be obtained with the winding hydraulic motor MII, this being very uneconomical. On the contrary, in case that the hydraulic motor MI is small while the hydraulic motor MII is large, it is possible to control a high degree of winding tension with the brake B having a small capacity and the resulting torque characteristic is conveniently a gradual decrease tension characteristic closer to a constant tension rather than a constant torque, however, the speed characteristic is bad and cannot be maintained constant.

Accordingly, in an arrangement according to the present invention, there is used either a hydraulic motor of variable capacity for the motor MII or a mechanical speed change gear in the transmission system thereof, whereby automatic speed change is effected in such a way that the ratio of the number of revolutions to the quantity of flow is decreased at a certain rate as the winding diameter is increased. In this case, if the capacity is increased in proportion to the winding diameter, the resulting characteristic is perfectly of a constant speed and constant tension nature. For this reason, in practice, by suitably determining the extent of the increase in the capacity relative to the change in the winding diameter and by suitably selecting the ratio of the quantities of flow for the hydraulic motors, the speed can be made as uniform as possible and, moreover, any desired tension and torque characteristic can be obtained.

It is thus seen from the above that according to the invention a hydraulic motor for feeding and driving a material to be wound and a hydraulic motor for rotating and driving a winding shaft branch off from a single hydraulic pump and receive pressure oil therefrom and are automatically controlled in such a manner that if the number of revolutions of one hydraulic motor is increased that of the other hydraulic motor is automatically decreased, and that according as the winding diameter on the winding shaft is increased the winding shaft rotating and driving hydraulic motor is adjusted so as to decrease the ratio of the number of revolutions to the quantity of inflow. The invention thus achieves the automatic control of the winding speed and winding tension to conform them to take desired characteristic curves as closely as possible. The utilization of a hydraulic transmission system is advantageous over gear drive system in that arrangement is simple and operation is smooth, dependable and efficient.

According to the invention, it is also possible to control the winding speed so as to take a perfectly constant value throughout the winding operation while allowing to obtain any tension characteristic as desired at will. The tensions and torque of various members are not relative to their driven speed but vary only according to the loads due to the brakes $B_5$ and B in FIGURES 1 and 3. Various characteristic curves deform in the same manner according to any change in the winding diameter. Accordingly, on one hand the winding speed can be maintained at a constant value during the winding operation by automatically controlling the speed change mechanism at the prime mover in response to the speed detected at a feed roller $R_1$ having a fixed diameter and on the other hand any tension characteristic as desired can be obtained by adequately selecting the aforesaid tension ratio $Ym$ of the differential drive. In addition, the total consumed horsepower can be kept at a constant value by maintaining the speed V constant since the total load tension is always constant.

Figure 3:
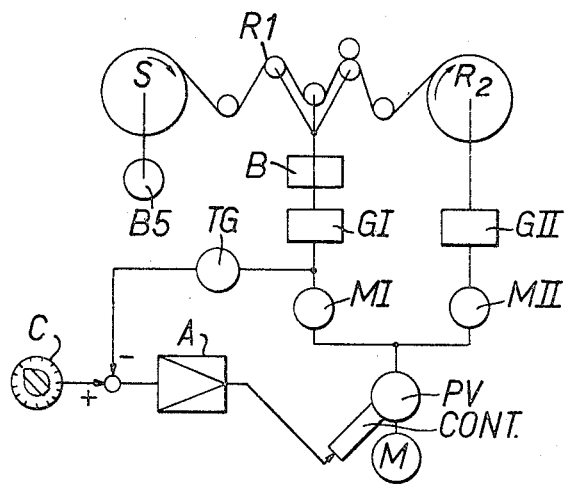
FIGURE 3 is a schematic view of a winding up transmission system showing another embodiment of the invention.

The transmission system illustrated in FIGURE 3 utilizes a variable capacity type hydraulic pump PV. In this embodiment the output signal according to any difference between the signal from a speed detector TG inserted in the transmission system for driving the roller $R_1$ and the reference signal from a manually operable speed adjusting means C is transmitted, preferably after being amplified by an amplifier A, to capacity controlling means CONT of the hydraulic pump PV to regulate the discharge therefrom so that the input to the amplifier A may always be kept at zero.

In the system illustrated in FIGURE 3, if the prime mover motor is of a variable speed type, the same effect as mentioned in the above will be obtained with the use of a mere fixed capacity type hydraulic pump instead of the variable capacity type hydraulic pump PV. In the case of a mechanical transmission, the same will be achieved by using either a variable speed motor or a continuously variable speed transmission.

Figure 4:
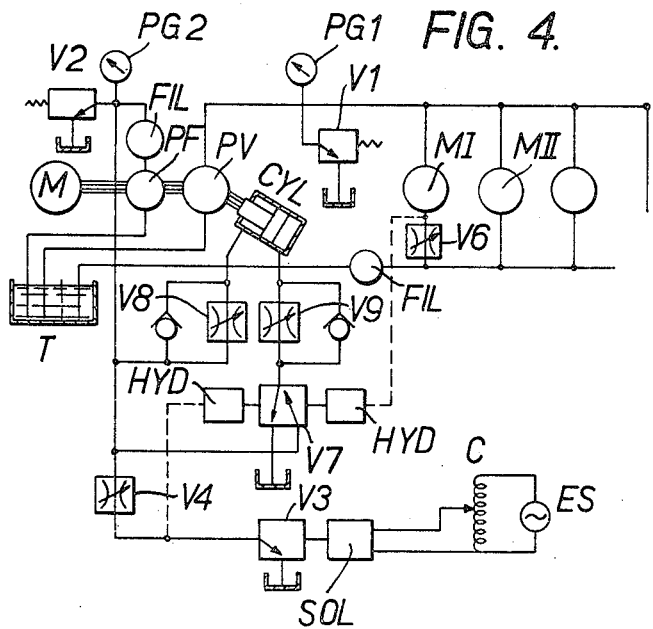
FIGURES 4 to 6 schematically illustrate some further embodiments of the invention.
Figure 5:
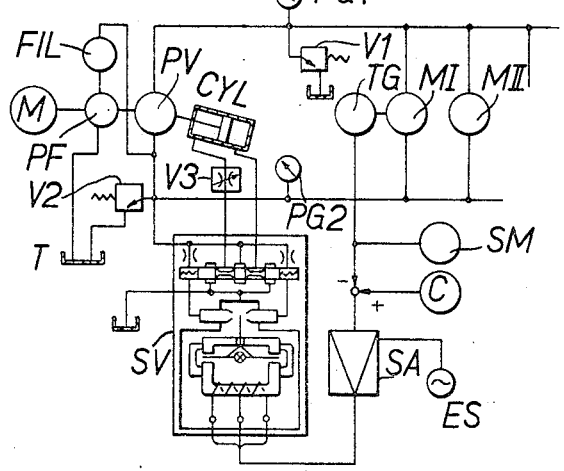
Figure 6:
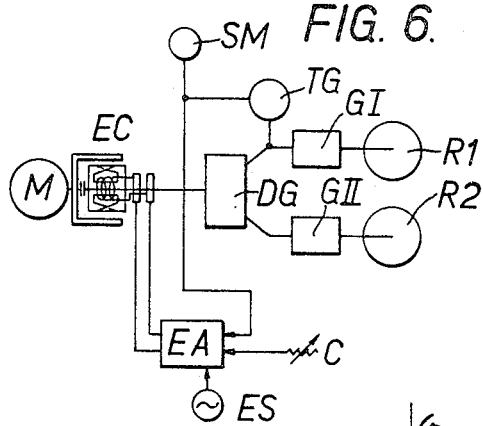

FIGURES 4, 5 and 6 show some actual examples embodying the invention. Throughout these three figures the same reference characters indicate the like parts.

FIGURE 4 shows a hydraulic transmission system of an open circuit type through the utilization of a self-suction pump, in which the whole system except speed adjusting means C is under a hydraulic control. The capacity of the variable capacity type hydraulic pump PV is regulated by means of a hydraulic cylinder CYL which is driven by another fixed capacity type hydraulic pump PF having a small capacity. The hydraulic pressure for the hydraulic pump PF is obtained from a relief valve $V_2$. The hydraulic drive three way servo-valve $V_7$ is operated to control both the direction and the quantity of the flow of oil toward the cylinder CYL and to control the discharge of the pump PV in such a manner that the hydraulic pressure at a solenoid relief valve $V_3$ from a variable voltage generator C for the speed adjustment is always kept to be equal to the hydraulic pressure generated at the inlet side of a throttle way $V_6$ according to the quantity of flow of the hydraulic pump MI. Other throttle valves $V_8$ and $V_9$ are for independently controlling the acceleration rate and the deceleration rate, respectively, and a further throttle valve $V_4$ is inserted to stabilize the operation of the relief valve $V_3$ so as not to drop the hydraulic pressure of the supply source. Es indicates an AC source; $PG_1$, a pressure gauge for indicating the hydraulic transmission pressure; $PG_2$, a pressure gauge for indicating the operating pressure; $V_1$, a safety valve used in connection with the pressure gauge $PG_1$; T, an oil tank; and FIL, a filter.

FIGURE 5 shows another hydraulic transmission system of a closed circuit type through the utilization of a precompressing type pump, in which an electrically operable four way servo-valve SV is used. The pump PF is utilized for precompressing oil to be introduced to the pump PV as well as for the controlling operation. The output according to the difference between the signal detected at a speed indicating dynamo TG between the signal from a speed adjusting means C is transmitted, after being amplified by a servo-amplifier SA, to a hydraulic cylinder CYL to operate it. SM indicates a speed meter.

FIGURE 6 shows a mechanical drive transmission system in which the whole system is controlled through the utilization of an eddy current joint speed change mechanism. The control amplifier EA for magnetizing the eddy current joint EC controls the joint EC in such a manner that the signal from the speed indicating dynamo may be kept at a predetermined value according to the signal from the speed regulator C.

Figure 7:
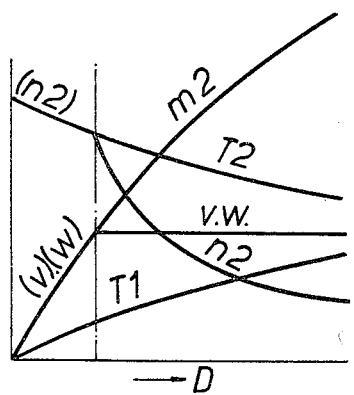
FIGURE 7 is a diagram showing various characteristics which are obtained with the use of any of the systems illustrated in FIGURES 3 to 6.

FIGURE 7 shows by way of example a diagram of various characteristic curves obtained with the system illustrated in any of FIGURES 3 to 6. In FIGURE 7, the reference characters $n_2$, $m_2$, $T_1$, $T_2$, $v$ and $w$ indicate the number of revolutions of the winding roll, the torque of the winding roll, the force exerted on the surface of the feed roller $R_1$, the winding tension at the winding roll $R_2$, the speed of the material to be wound and the input horsepower, respectively.

As is seen from the above description with reference to the drawings, the improved differential winding up system according to the invention makes it possible to maintain a constant winding up speed irrespective of the increasing winding diameter, still allowing to take any gradually reducing tension characteristic as desired. The gradually reducing tension characteristic is such that the tension varies automatically with a predetermined rate according as the winding diameter is increased, where no particular control from the outside is required therefor. In addition, since the total consumed horsepower is maintained at a constant value an effective utilization of the motive power is achieved to utmost extent throughout the whole winding operation. The selection of the initial speed and, if necessary, any change of the speed during the winding operation can be carried out without difficulty by merely turning a control knob. In the case of a hydraulic transmission, there are obtained various additional advantages. One of the typical advantages is that slow start with a predetermined acceleration rate and slow stop with a predetermined deceleration rate can be effected by switching by a valve the flow passages toward the cylinder in the speed change mechanism. The acceleration or deceleration rate may be selected at any value as desired.

What we claim is:

1. In a differential winding up system for winders including a supply roll, delivering means for the material to be wound up from said supply roll, a winding roll, winding roll shaft driving means and hydraulic differential transmission means, said hydraulic differential transmission means imparting differential outputs from a single drive power source to said delivering means and said winding roll shaft driving means, said differential transmission means comprising a hydraulic pump and at least two hydraulic motors for driving said delivering means and said winding roll shaft, respectively, said two hydraulic motors being connected in parallel with respect to said hydraulic pump, an improvement characterized in that said hydraulic motor for driving said winding roll shaft is controlled in such a manner that the ratio of the number of revolutions of said hydraulic motor to its quantity of flow is automatically reduced with a predetermined rate accordingly as the winding diameter is increased.

2. A differential winding up system as defined in claim 1, in which said hydraulic motor for driving said winding roll shaft is provided with means for continuously varying the capacity of said motor.

3. A differential winding up system as defined in claim 1, in which the output of the hydraulic motor for driving the winding roll shaft is considerably larger than that of the hydraulic motor for driving said delivering means.

4. In a differential winding up system for winders including a supply roll, delivering means for the material to be wound up from said supply roll, said delivering means including at least one roller having a fixed diameter, a winding roll, winding roll shaft driving means and differential transmission means, said differential transmission means imparting differential outputs from a single drive power source to said delivering means and said winding roll shaft driving means, an improvement characterized in that the feeding speed of the material to be wound is detected at said roller having a fixed diameter and the speed change mechanism of the prime mover of said system is automatically controlled so that said detected feeding speed is always maintained at a constant value.

References Cited

UNITED STATES PATENTS

| | | | |
|---|---|---|---|
| 2,164,599 | 7/1939 | Tyler | 242—75.53 |
| 2,181,049 | 11/1939 | Douglas | 242—75.53 X |
| 2,469,004 | 5/1949 | Rosebrough | 242—75.53 |
| 2,753,128 | 7/1956 | Thomas et al. | 242—75.5 |
| 2,924,869 | 2/1960 | Klein et al. | 242—75.43 X |

NATHAN L. MINTZ, Primary Examiner